US012657525B2

(12) United States Patent
Sesha

(10) Patent No.: US 12,657,525 B2
(45) Date of Patent: Jun. 16, 2026

(54) PRIVACY PRESERVING AND DE-CENTRALIZED DETECTION OF GLOBAL OUTLIERS

(71) Applicant: HEWLETT PACKARD ENTERPRISE DEVELOPMENT LP, Houston, TX (US)

(72) Inventor: Madhusoodhana Chari Sesha, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1193 days.

(21) Appl. No.: 17/574,409

(22) Filed: Jan. 12, 2022

(65) Prior Publication Data

US 2023/0222395 A1 Jul. 13, 2023

(51) Int. Cl.
*G06N 20/20* (2019.01)
*G06F 18/22* (2023.01)
*G06F 18/232* (2023.01)

(52) U.S. Cl.
CPC ............. *G06N 20/20* (2019.01); *G06F 18/22* (2023.01); *G06F 18/232* (2023.01)

(58) Field of Classification Search
CPC ........ G06N 20/20; G06F 18/22; G06F 18/232
See application file for complete search history.

(56) References Cited

U.S. PATENT DOCUMENTS

| | | |
|---|---|---|
| 7,356,430 B2 | 4/2008 | Miguelanez et al. |
| 10,366,289 B2 | 7/2019 | Puttagunta et al. |

| | | | |
|---|---|---|---|
| 2006/0176834 A1* | 8/2006 | Dickerson | H04N 7/185 |
| | | | 370/352 |
| 2018/0018590 A1 | 1/2018 | Szeto et al. | |
| 2018/0373991 A1 | 12/2018 | Rosenberg et al. | |
| 2019/0121529 A1 | 4/2019 | Rosenberg et al. | |

(Continued)

FOREIGN PATENT DOCUMENTS

WO 2020/251155 A1 12/2020

OTHER PUBLICATIONS

Preuveneers, Davy et al., "Chained Anomaly Detection Models for Federated Learning: An Intrusion Detection Case Study", 2018, Applied Sciences, 8(12), pp. 1-21 (Year: 2021).*

(Continued)

*Primary Examiner* — Haimei Jiang
*Assistant Examiner* — Thomas Bernard Lane
(74) *Attorney, Agent, or Firm* — Sheppard Mullin Richter Hampton LLP

(57) ABSTRACT

Systems and methods are provided for implementing a distributed training by exchanging learnt parameters generated from unsupervised machine learning (ML) modeling. Each device in a distributed network may implement the unsupervised ML model to determine clusters of input data and/or determine a centroid of each determined cluster. The approximate centroid location of each cluster of data may be transmitted to other network devices in the local computing environment or other distributed computing environments. Each device may share their list of centroids of the clusters with other network devices (e.g., to implement swarm learning). These distributed network devices may compare the received centroids with centroids generated from a local ML model at each network device and initiate an action in response to the comparison.

20 Claims, 7 Drawing Sheets

(56) References Cited

U.S. PATENT DOCUMENTS

| 2020/0153843 | A1* | 5/2020 | Aksela | .................. G06N 20/00 |
| 2020/0220887 | A1 | 7/2020 | A.K. | |
| 2020/0293887 | A1 | 9/2020 | De et al. | |
| 2020/0349169 | A1* | 11/2020 | Venkatesan | .............. G06N 5/01 |
| 2021/0105613 | A1 | 4/2021 | San Miguel et al. | |

OTHER PUBLICATIONS

Xiong, Zhaoqi et al, "Do Switches Dream of Machine Learning? Toward In-Network Classification", 2019, Association for Computing Machinery, pp. 25-33 (Year: 2019).*
Rajasegarar, Sutharshan et al., "Distributed Anomaly Detection in Wireless Sensor Networks" 2006, IEEE, pp. 1-5 (Year: 2006).*
Xie, Bin et al., "An Improved K-Means Clustering Intrusion Detection Algorithm for Wireless Networks Based on Federated Learning", Aug. 10, 2021, Hindawi Wireless Communications and Mobile Computing, vol. 2021, pp. 1-15 (Year: 2021).*
Li, Xinze et al., "An Automated Data Engineering Pipeline for Anomaly Detection of IoT Sensor Data", Sep. 29, 2021 , arXiv, pp. 1-32 (Year: 2021).*
Preuveneers, Davy et al., "Chained Anomaly Detection Models for Federated Learning: An Intrusion Detection Case Study", 2018, Applied Sciences, 8(12), pp. 1-21 (Year: 2018).*

* cited by examiner

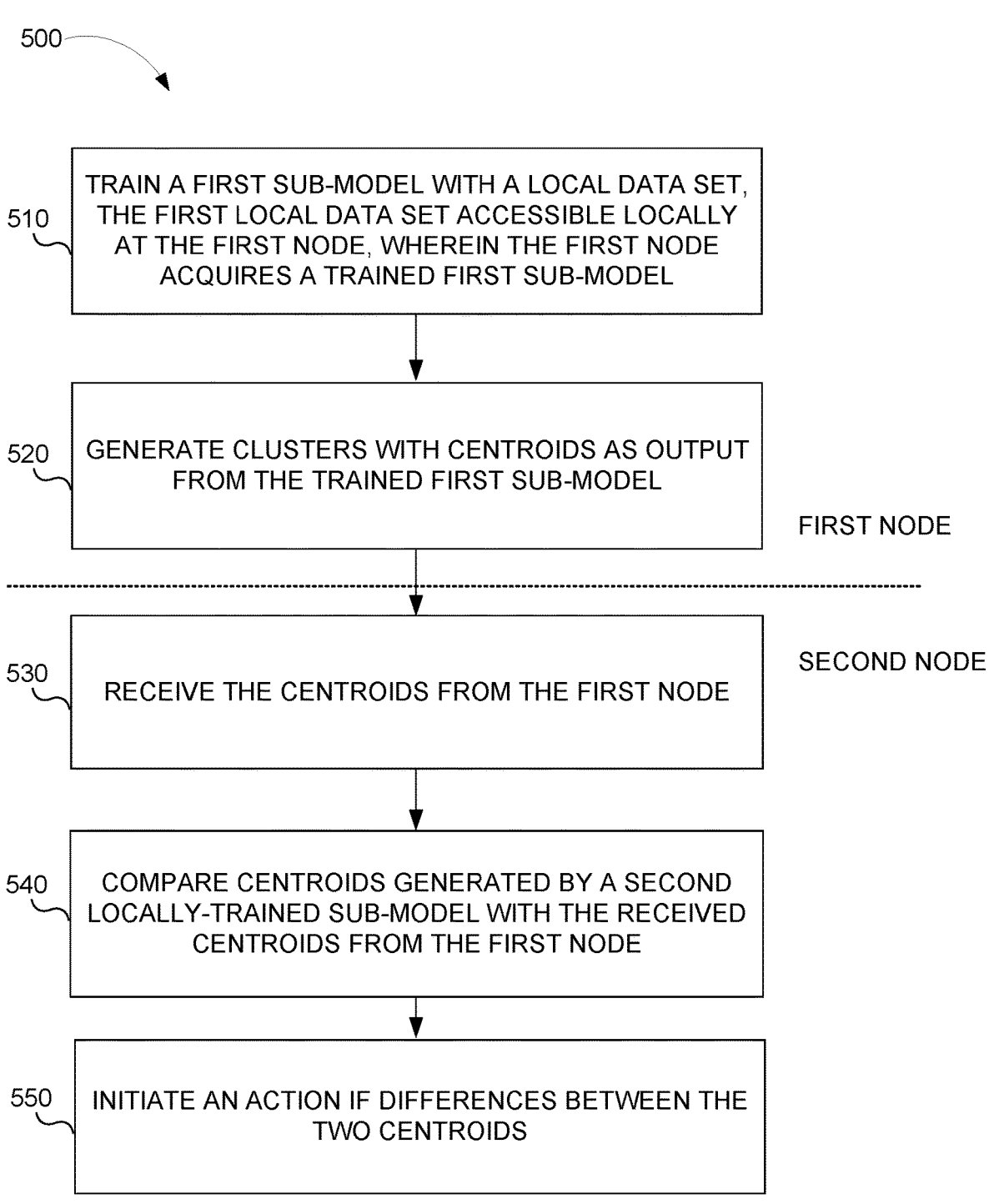

500

510  TRAIN A FIRST SUB-MODEL WITH A LOCAL DATA SET, THE FIRST LOCAL DATA SET ACCESSIBLE LOCALLY AT THE FIRST NODE, WHEREIN THE FIRST NODE ACQUIRES A TRAINED FIRST SUB-MODEL

520  GENERATE CLUSTERS WITH CENTROIDS AS OUTPUT FROM THE TRAINED FIRST SUB-MODEL

FIRST NODE

SECOND NODE

530  RECEIVE THE CENTROIDS FROM THE FIRST NODE

540  COMPARE CENTROIDS GENERATED BY A SECOND LOCALLY-TRAINED SUB-MODEL WITH THE RECEIVED CENTROIDS FROM THE FIRST NODE

550  INITIATE AN ACTION IF DIFFERENCES BETWEEN THE TWO CENTROIDS

FIG. 5

COMPUTING COMPONENT 600

HARDWARE PROCESSORS 602

MACHINE-READABLE STORAGE MEDIA 604

DETERMINE CENTROIDS USING FIRST ML MODEL 606

COMPARE FIRST CENTROIDS WITH SECOND CENTROIDS 608

INITIATE AN ACTION BASED ON THE COMPARISON OF CENTROIDS 610

PRIVACY PRESERVING AND DE-CENTRALIZED DETECTION OF GLOBAL OUTLIERS

BACKGROUND

Machine learning (ML) generally involves a computer-implemented process that builds a model using sample data (e.g., training data) in order to make predictions or decisions without being explicitly programmed to do so. ML processes are used in a wide variety of applications, particularly where it is difficult or unfeasible to develop conventional algorithms to perform various computing tasks.

A particular type of ML process, called supervised machine learning, offers state-of-the-art classification of received data for a variety of classification tasks. The process for setting up the supervised machine learning generally involves (a) centralizing a large data repository, (b) acquiring a ground truth for these data, and (c) employing the ground truth to train the ML model for the classification task. However, this framework poses significant practical challenges, including data privacy and security challenges that come with creating a large central data repository for training the ML model.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 is an illustrative training and comparison process performed between two nodes, in accordance with examples of the disclosure.

Figure 1:
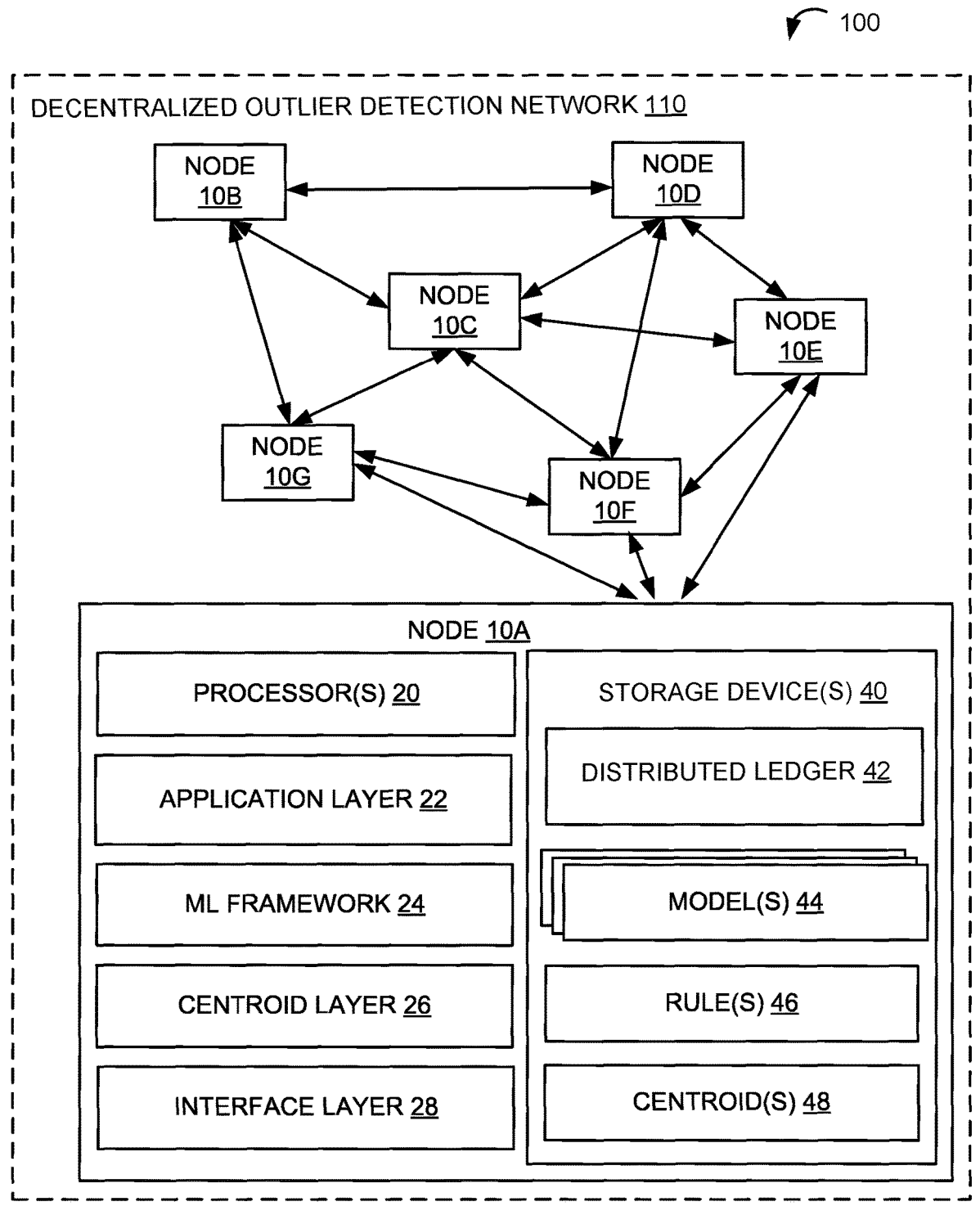
FIG. 1 illustrates an example system of privacy preserving and de-centralized detection of global outliers using blockchain, according to an example implementation of the disclosure.

The figures are not exhaustive and do not limit the present disclosure to the precise form disclosed.

DETAILED DESCRIPTION

Network devices (e.g., IOT devices, switches, hubs, virtual machines, compute nodes, and other devices, used interchangeably) generate time series sensor data and/or telemetry data. The data may comprise, for example, data flow information, packet headers, and other network behaviors. Various monitoring applications may be implemented on these network devices as well to generate even more data, including third party pointed services. For example, the data can include a histogram that visually represents the amount of incoming electronic messages (e.g., read and write requests to a data store) as a relative image size compared to other image sizes showing other types of data. In other examples, the data may include system health values (e.g., bandwidth, transmission capacity, processing speed, or packets transmitted within a timeframe). However, this data is not often shared with other network devices or utilized to troubleshoot network communication issues.

Various issues arise when the data is attempted to be shared among network devices. For example, various devices may correspond with different entities and these entities may limit data from being shared outside of their network environment for privacy concerns. In the government sector in particular, even knowing the activity that the data corresponds with can affect the privacy and security of the network environment and enable improper backdoor access to the network environment.

In addition to privacy concerns, other technical problems arise with merely sharing data between network environments. These may include a hesitancy in adopting a different entity's data, cost/time to incorporate the data, or how the data from a first environment is mapped to existing data in a second environment. Technical limitations also arise, including physical limitations in data storage of an extremely large amount of data, data pipelines, data cleaning and noise, and frequency of data.

Swarm learning may help in this context. In some examples, swarm learning may allow network environments to keep confidential data local and unshared, while sharing processed data or other information to network devices in other computing environments. The network devices can use the shared data for de-centralized learning while preserving the privacy of its own data.

Swarm learning may allow the distributed network devices to implement a distributed training by exchanging learnt parameters generated from unsupervised machine learning (ML) modeling. A local unsupervised ML model can store its own weights and biases determined from executing a training process of one or more ML models. Once the ML model is trained, the local telemetry data can be provided as input to the trained ML model at the device to determine one or more clusters of data as output that are specific to the device. Each device may implement the unsupervised ML model to determine clusters of input data and/or determine a centroid of each determined cluster. The centroid of a cluster may correspond with an average X-value of each member of a cluster of values (e.g., an X-axis value of a plotted graph of values) and an average Y-value of each member of the cluster.

One illustrative unsupervised ML model technique is K-nearest neighbors, to classify inputs (e.g., local telemetry/sensor data) based on observed similarities among the multivariate distribution densities of independent variables in a manner that may correlate with similar sensor activity. The ML model may group the similar data into clusters and determine a centroid of each cluster for a common point among the grouped data.

The approximate centroid location of each cluster of data may be transmitted to other network devices in the local computing environment or other distributed computing environments. Each device may share their list of centroids of the clusters with other network devices (e.g., to implement swarm learning). These distributed network devices may compare the received centroids with centroids generated from a local ML model at each network device and initiate an action in response to the comparison.

In some examples, the centroids may be compared with a threshold value. When the centroid exceeds a predetermined distance from the threshold value, a similar action may be initiated (e.g., to alert of any distinctions identified in the comparison with the threshold). The distinctions in excess of the threshold value may correspond with an anomaly in the network environment.

When an anomaly is found in comparing the individually generated lists or comparing the centroid with a threshold value, an action may be initiated. For example, the action may be to generate an alert to a system administrator that distinctions exist in excess of a threshold value between the two network devices of the computing environment. Other actions may include, for example, automatically rerouting data traffic, restarting a network device, updating an outlier log file, or other actions. The action may help identify or remedy the anomaly.

As an illustrative example, the timeseries data at a first network device may identify operating parameters at the first network device. The data may comprise, for example, a speed of a processor fan (e.g., identified over time that the speed of the fan is steadily decreasing due to decreasing external temperatures from an air conditioning unit in a building or decreasing seasonal temperatures). The trained ML model at the network device may provide the data to the trained ML model and generate one or more centroids identifying the clustered data from the processor fan. The centroids generated from various time periods may be compared internally (e.g., to determine the internal fan speed is decreasing over time) or transmitted to another network device in the computing environment and compared with centroids from that data set (e.g., to determine that both fans are decreasing over time in response to the same environment). If there is a variation in excess of a threshold value, the network device may initiate an action to remedy the issue.

Similar illustrative examples may apply as well. For example, the network devices may correspond with a plurality of switches that include processors and memory in the same network environment or across branches. In another example, various network devices may comprise similar software applications where the centroids of data may be compared to identify similarities and distinctions. In yet another example, network devices that generate input/output (I/O) physical telemetry may be analyzed and compared to predict an impeding device failure in an environment.

Technical improvements are realized throughout the disclosure. For example, by distributing and combining the anomaly detection, the method can allow for faster detection of issues from multiple angles/devices, leading to accelerated troubleshooting and identification of issues that might not be caught when only a single device is detecting issues. Additionally, the anomaly detection is implemented at the network device, which is closer to the location where the data is generated and can address potential issues faster and more efficiently than traditional systems.

In other examples, collaborative learning is achieved in a truly distributed, privacy-preserving manner. This application describes transmitting learned data from locally trained ML models and receiving other learned data from other participating network devices, instead of transmitting the confidential data or ML models themselves. The proposed system automatically identifies centroids using swarm learning or other machine learning method and, when the determined centroids differ, an alert is generated to quickly remedy the different characteristics of the network.

FIG. 1 illustrates an example system of privacy preserving and de-centralized detection of global outliers using blockchain, according to an example implementation of the disclosure. Illustrative system 100 comprises decentralized outlier detection network 110 with a plurality of network devices or nodes 10 (used interchangeably) in a cluster or group of nodes at a location (illustrated as first node 10A, second node 10B, third node 10C, fourth node 10D, fifth node 10E, sixth node 10F, seventh node 10F).

Plurality of nodes 10 in the cluster in decentralized outlier detection network 110 (also referred to as a blockchain network 110) may comprise any number, configuration, and connections between nodes 10. As such, the arrangement of nodes 10 shown in FIG. 1 is for illustrative purposes only. Node 10 may be a fixed or mobile network device. Examples of further details of node 10 will now be described. While only one of nodes 10 is illustrated in detail in the figures, each of nodes 10 may be configured in the manner illustrated.

Node 10 may include one or more processors 20 (interchangeably referred to herein as processors 20, processor(s) 20, or processor 20 for convenience), one or more storage devices 40, or other components.

Distributed ledger 42 may include a series of blocks of data that reference at least another block, such as a previous block. In this manner, the blocks of data may be chained together as distributed ledger 42. For example, in a distributed currency context, a plurality of exchanges may exist to transfer a user's currency into a digital or virtual currency. Once the digital or virtual currency is assigned to a digital wallet of a first user, the first user may transfer the value of the digital or virtual currency to a digital wallet of a second user in exchange for goods or services. The digital or virtual currency network may be secured by edge devices or servers (e.g., miners) that are rewarded new digital or virtual currency for verifying this and other transactions occurring on the network. After verification, the transaction from the digital wallet of the first user to the digital wallet of the second user may be recorded in distributed ledger 42, where a portion of distributed ledger 42 may be stored on each of the edge devices or servers.

In some implementations, distributed ledger 42 may provide a blockchain with a built-in fully fledged Turing-complete programming language that can be used to create "contracts" that can be used to encode arbitrary state transition functions. Distributed ledger 42 may correspond with a protocol for building decentralized applications using an abstract foundational layer. The abstract foundational layer may include a blockchain with a built-in Turing-complete programming language, allowing various decentralized systems to write smart contracts and decentralized applications that can communicate with other decentralized systems via a swarm learning, ML model platform. Each system can create their own arbitrary rules for ownership, transaction formats, and state transition functions. Smart contracts or blocks can contain one or more values (e.g., state) and be encrypted until they are unlocked by meeting conditions of the system's protocol.

Distributed ledger 42 may store the blocks that indicate a state of node 10 relating to its machine learning during an iteration. Thus, distributed ledger 42 may store an immutable record of the state transitions of node 10. In this manner, distributed ledger 42 may store a current and historic state of an ML model in model data store 44.

Model data store 44 may be memory storage (e.g., data store) for storing locally trained ML models at node 10 based on locally accessible data, as described herein, and then updated based on model parameters learned at other participant nodes 10. As noted elsewhere herein, the nature of model data store 44 will be based on the particular implementation of the node 10 itself. For instance, model data store 44 may include trained parameters relating: to self-driving vehicle features such as sensor information as it relates object detection, dryer appliance relating to drying times and controls, network configuration features for network configurations, security features relating to network security such as intrusion detection, and/or other context-based models.

Rules 46 may include smart contracts or computer-readable rules that configure nodes to behave in certain ways in relation to decentralized machine learning and enable decentralized control. For example, rules 46 may specify deterministic state transitions, when and how to elect a voted leader node, when to initiate an iteration of machine learning, whether to permit a node to enroll in an iteration, a number of nodes required to agree to a consensus decision, a percentage of voting participant nodes required to agree to a consensus decision, and/or other actions that node 10 may take for decentralized machine learning.

Centroid ensemble 48 may include rules that define centroids of clusters. Centroid ensemble 48 may include, for example, rules for generating clusters from a trained, unsupervised machine learning (ML) models (e.g., K-means), determining centroids of those clusters, and/or comparing centroids from peer nodes to determine differences between the individually determined centroids determined by various ML models. Each of the clusters or centroids may be determined by a local ML model at a first node and transmitted to other nodes, such that the other nodes may compare locally determined clusters or centroids with the transmitted ones. The rules may identify differences between the two ML model outputs during a centroid ensemble process. In the ensemble process, the system may learn how to best combine output predictions from two or more of the ML models and store the ML models in model data store 44.

In some examples, a centroid of a cluster may be determined. For example, the X-value of each member of a cluster of values (e.g., an X-axis value of a plotted graph of values) may be averaged to determine an average X-value, and the same process may be implemented for all Y-values. With the average X-value and Y-value, centroid ensemble 48 may plot each of the cluster centroids and determine whether any points are closer to a centroid of another cluster than they are to the centroid of their own cluster. If any points are closer to a different centroid, centroid ensemble 48 may redistribute them to the cluster containing the closer centroid. These steps may be repeated until all points of data are in the cluster containing the centroid to which they are closest.

Processors 20 may obtain other data accessible locally to node 10 but not necessarily accessible to other nodes 10. Such locally accessible data may include, for example, private data that should not be shared with other devices but model parameters that are learned from the private data can be shared.

Processors 20 may be programmed by one or more computer program instructions. For example, processors 20 may be programmed to execute application layer 22, machine learning framework 24 (illustrated and also referred to as ML framework 24), centroid layer 26, interface layer 28, or other instructions to perform various operations, each of which are described in greater detail herein. As used herein, for convenience, the various instructions will be described as performing an operation, when, in fact, the various instructions program processors 20 (and therefore node 10) to perform the operation.

Application layer 22 may execute applications on the node 10. For instance, application layer 22 may include a blockchain agent (not illustrated) that programs node 10 to participate in a decentralized machine learning across blockchain network 110 as described herein. Each node 10 may be programmed with the same blockchain agent, thereby ensuring that each acts according to the same set of decentralized model building rules, such as those encoded using rules 46. For example, the blockchain agent may program each node 10 to train a ML model using local data. Application layer 22 may execute machine learning through the ML framework 24.

Application layer 22 may use interface layer 28 to interact with and participate in the blockchain network 110 for decentralized machine learning across multiple participant nodes 10. Interface layer 28 may communicate with other nodes using blockchain by, for example, broadcasting blockchain transactions and writing blocks to the distributed ledger 42 based on those transactions.

Application layer 22 may use the distributed ledger 42 to coordinate parallel model building during an iteration with other participant nodes 10 in accordance with rules 46.

In some examples, application layer 22 implements an application programming interface (API) library. Calling the API may automatically insert the required machine readable instructions for the nodes to seamlessly exchange parameters (e.g., centroids or other data) at the end of each model training, and subsequently continue the training after resetting the local models to the globally merged parameters.

ML framework 24 may train a ML model based on data accessible locally at node 10. For example, ML framework 24 may generate model parameters from sensor data, data aggregated from nodes 10 or other sources, data that is licensed for sources, and/or other devices or data sources to which the node 10 has access. The data may include private data that is owned by the particular node 10 and not visible to other devices. In an implementation, the ML framework 24 may use the TensorFlow™ machine learning framework, although other frameworks may be used as well. In some of these implementations, a third party framework Application Programming Interface (API) may be used to access certain model building functions provided by the machine learning framework. For example, node 10 may execute API calls to TensorFlow™ or other machine learning framework.

ML framework 24 may train one or more ML models on private data siloes. The architecture of the decentralized ML model is described in greater detail in U.S. patent application Ser. No. 16/163,159 and India Patent Application No. 201841016309, the contents of which are incorporated by reference herein.

ML framework 24 of each node 10 may train the ML models using multiple phases. Each iteration of ML model training (also referred to herein as machine learning, model training, or model building) may include multiple phases, such as a first and second phases. In the first phase, each node 10 trains its local ML models independently of other nodes 10 using its local training dataset, which may be accessible locally to the node but not to other nodes. As such, each node 10 may generate ML model parameters resulting from the local training dataset.

In the second phase, nodes 10 may each share processed data generated by the ML model with other nodes in the blockchain network 110. For example, each node 10 may share its centroids generated by its ML model to a subset of nodes 10. The subset of nodes 10 may compare the centroids from the other nodes 10. The centroids corresponding with the clusters that differ from node to node may be distributed to the other nodes 10. By distributing the centroids, each node can identify the clusters that may correspond with an issue that is identified using local training data to the node that is not accessible by other nodes 10 in the cluster.

Figure 2:
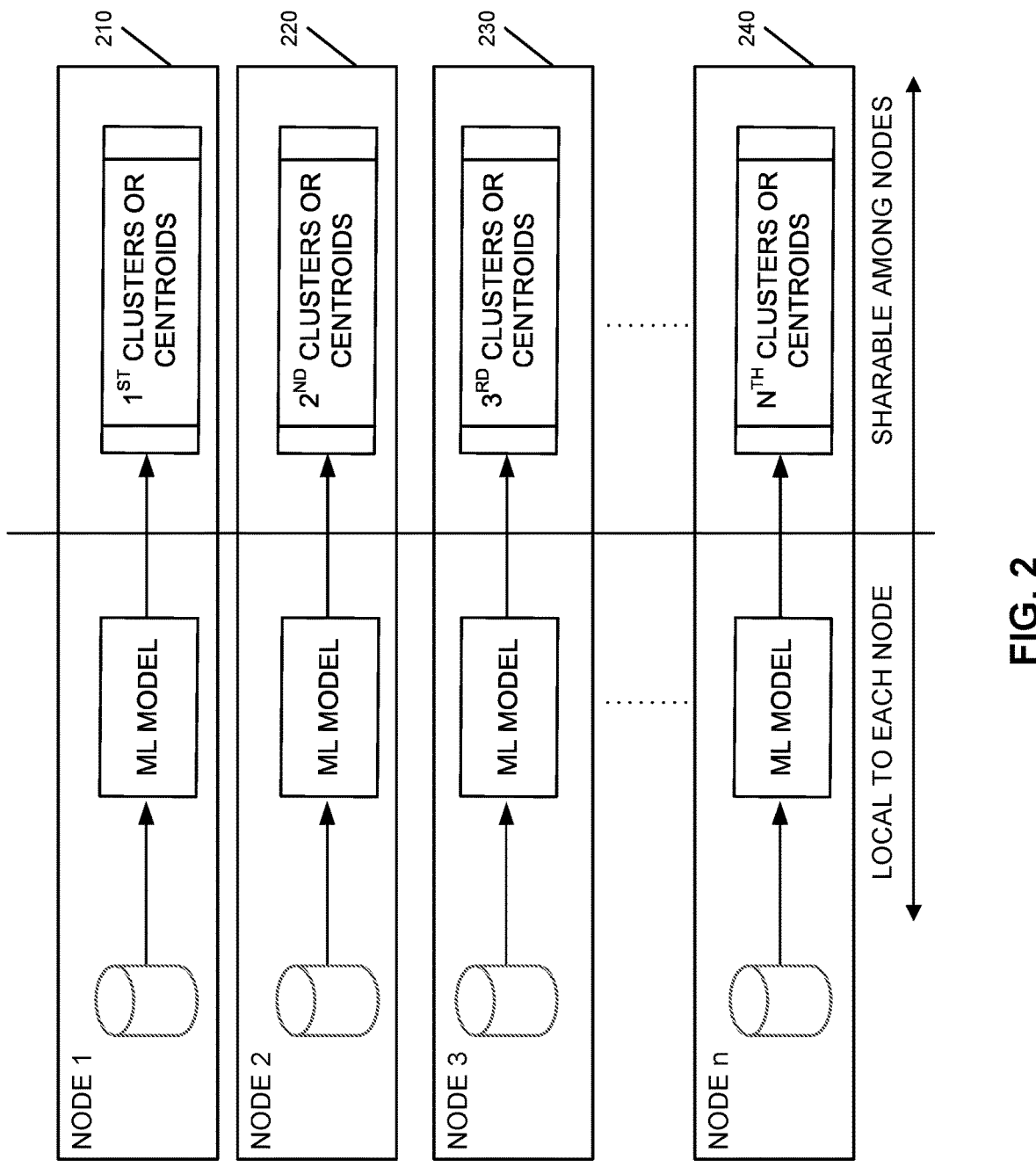
FIG. 2 illustrates a plurality of nodes that generate ML models, in accordance with examples of the disclosure.

FIG. 2 illustrates a plurality of nodes that generate ML models, in accordance with examples of the disclosure. In this illustration, nodes 10 are illustrated as first node 210 that trains and generates first ML model, second node 220 that trains and generates a second ML model, third node 230 that trains and generates a third ML model, and fourth node 240 that trains and generates a fourth ML model. The ML models may correspond with various model types, including a neural network (NN) ML model, support-vector machine (SVM) ML model, logistic regression (LR) ML model, random forest (RF) ML model, K-means ML model, or other unsupervised ML models. The number of nodes and particular models listed herein are provided for illustrative purposes only and should not be limiting to the disclosure.

In this setup, each participant node 10 generates a ML model as a black box function to other nodes in the network. Training performed locally at the participant node is learnt from the private data on each of the participant nodes 10. Each ML model may be built and trained locally using one or more local data sets at each node. In some examples, both the sensor/telemetry data and the ML model may not leave the node.

Nodes 10 may each comprise different ML models and each of the ML models may have the same unsupervised learning objective (e.g., generating clusters and/or centroids of the clusters). In other words, the ML models may be trained for the same machine learning problem. Models may differ in the architecture and its use of a swarm learning, ML model platform to implement the ML model, but may solve the same ML problem (e.g., by generating a set of clusters that group potential issues in a network, which are analyzed to determine centroids of the issue).

The ML models may have arbitrarily complex or simple architectures on their own. The arbitrarily complex architectures may, unlike state-of-art Federated learning which trains only one kind of ML model, each of nodes 10 can implement its own kind of ML model and ML framework 24 can combine several kinds of ML models. As an illustrative example, if the users are building a model to classify wines based on a set of attributes, all ML models should do the same. One ML model may not mix a regression model with a classification model. This assumption can allow ML framework 24 to architect a system that combines ML models where the individual nodes may bring in their own models and expertise in designing their local models to a collaborative learning system.

The architecture of each ML model may also comprise the same input and output vector with some degree of confidence about the correctness of the predicted output. The use of the same input and output vectors may ensure that node 10 can compose a stacked ensemble in a deterministic way.

Each node may compile a list of centroids to share with other nodes using centroid layer 26. Centroid layer 26 may generate a list of centroids by providing local telemetry data as input to the trained ML model (at node 10) to determine one or more clusters of data as output. The approximate centroid location of each cluster of data may be determined and transmitted to other compute nodes in the local computing environment or other distributed computing environments.

Centroid layer 26 may receive centroids from other nodes and compare the centroids from the peer nodes. Each of the nodes can run similar ML models and applications to generate the data and the list of centroids.

Each device may share their list of clusters and/or centroids of the clusters with other devices in the network (e.g., to implement swarm learning). These distributed nodes may compare the received centroids with centroids generated from a local ML model at each compute node and initiate an action to alert of any distinctions in excess of a threshold value between the two nodes or computing environments. The distinctions in excess of the threshold value may correspond with an anomaly in the network environment. When an anomaly is found in comparing the individually generated lists, an action is initiated (e.g., an alert message, an automated rerouting data traffic, restarting a network device, or other actions). The action may help identify or remedy the anomaly.

Centroid layer 26 may store the list of centroids in a data store, like centroid data store 48. In some examples, centroids are frozen after they are stored and may be compared with historical centroids in a time-over-time comparison.

Figure 3:
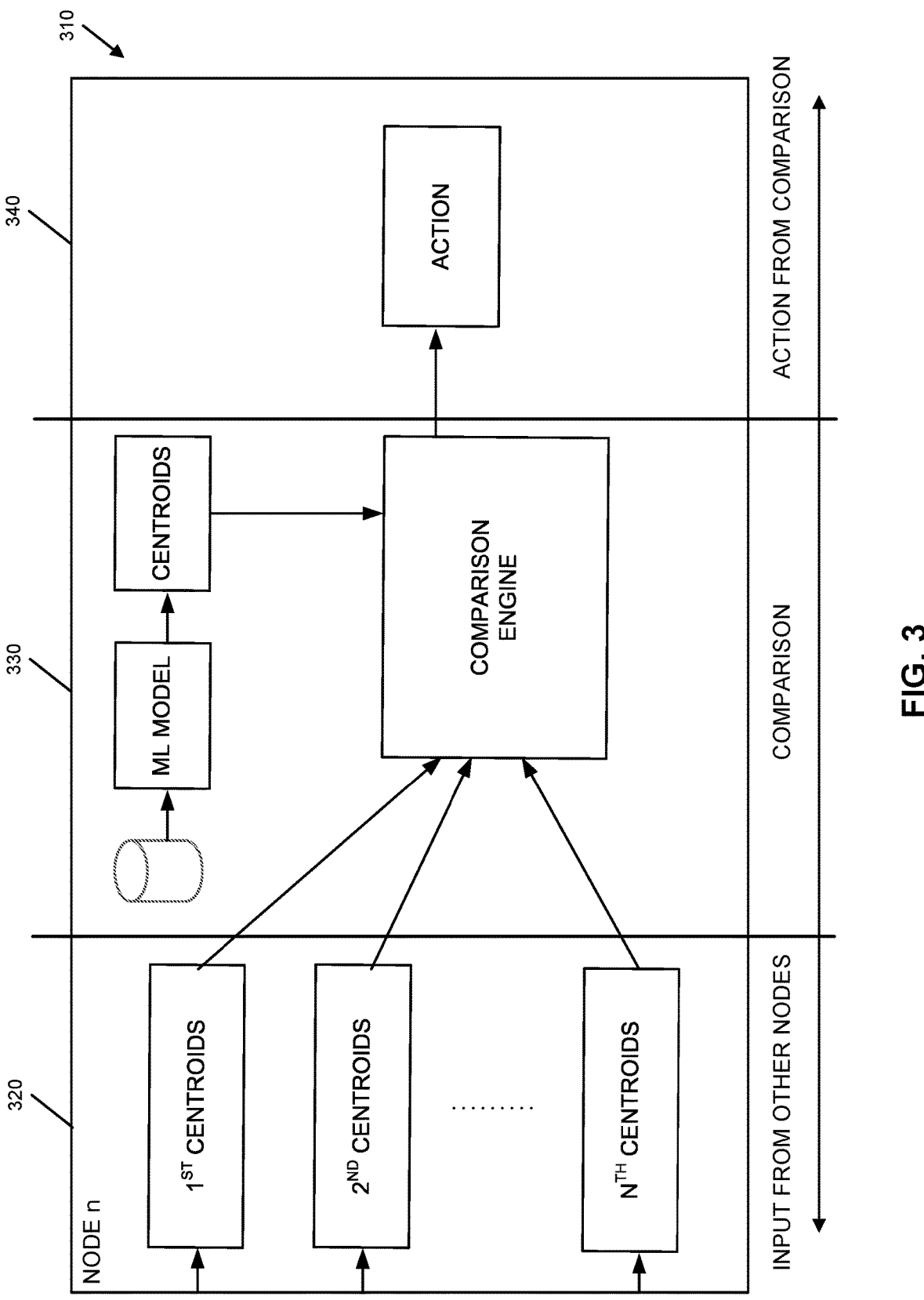
FIG. 3 illustrates a learning process for determining global outliers, according to an example implementation of the disclosure.

An illustrative example of sharing, comparing, and storing centroids from various nodes is illustrated in FIG. 3. For example, nodes 10 may be categorized into a voted leader node or subset of nodes 310, including one or more participant nodes and one or more voted leader nodes. The participant nodes may provide information to the voted leader nodes (e.g., the centroids), where the voted leader nodes may compare the output from various sources and use the comparison to initiate performance of an action. In some examples, the participant nodes may also be a voted leader node.

Subset of nodes 310 can correspond with one or more nodes 10 that are voted or pre-designated leader nodes to receive and combine the centroids individually-generated from the participant nodes using local ML models. Each of the participant nodes 10 can have the functionality to generate and/or compare the centroids, and subset of nodes 310 or voted leader nodes may activate this functionality. In some examples, participant nodes 10 may not activate this functionality, except for subset of nodes 310 or voted leader nodes.

Once an agreement or consensus among the nodes 10 is reached in determining a voted leader nodes or subset of nodes 310, the participant nodes 10 may transmit the list of centroids to each of the subset of nodes 310. In the input phase 320, the voted leader node or subset of nodes 310 may receive the list of centroids from the participant nodes 10.

In the comparison phase 330, each of subset of nodes 310 may compare the locally determined centroids with the list of received centroids to determine one or more centroids that differ. It should be noted that each of subset of nodes 310 may have itself generated local centroids from its local training dataset.

When differences in the list of centroids that are received from the participant nodes 10 are determined from the locally-determined centroids, an action may be initiated at the action phase 340. For example, the action may be to generate an alert to a system administrator that distinctions exist in excess of a threshold value between the two network devices of the computing environment. Other actions may include, for example, automatically rerouting data traffic, restarting a network device, updating an outlier log file, or other actions. The action may help identify or remedy the anomaly. In particular, the process can allow for faster detection of issues from multiple angles/devices, leading to accelerated troubleshooting and identification of issues that might not be caught when only a single device is detecting issues.

Returning to FIG. 1, interface layer 28 may share the one or more parameters and inferences with the other participant nodes 10. The other nodes 10 can incorporate the parameters and inferences with their local ML models to retrain the ML models using the local data and updated parameters and inferences.

Interface layer 28 may include a messaging interface used to communicate via a network with other participant nodes 10. The messaging interface may be configured as a Secure Hypertext Transmission Protocol ("HTTPS") microserver. Other types of messaging interfaces may be used as well. Interface layer 28 may use a blockchain API to make calls for blockchain functions based on a blockchain specification. Examples of blockchain functions include, but are not limited to, reading and writing blockchain transactions and reading and writing blockchain blocks to the distributed ledger 42.

Figure 4:
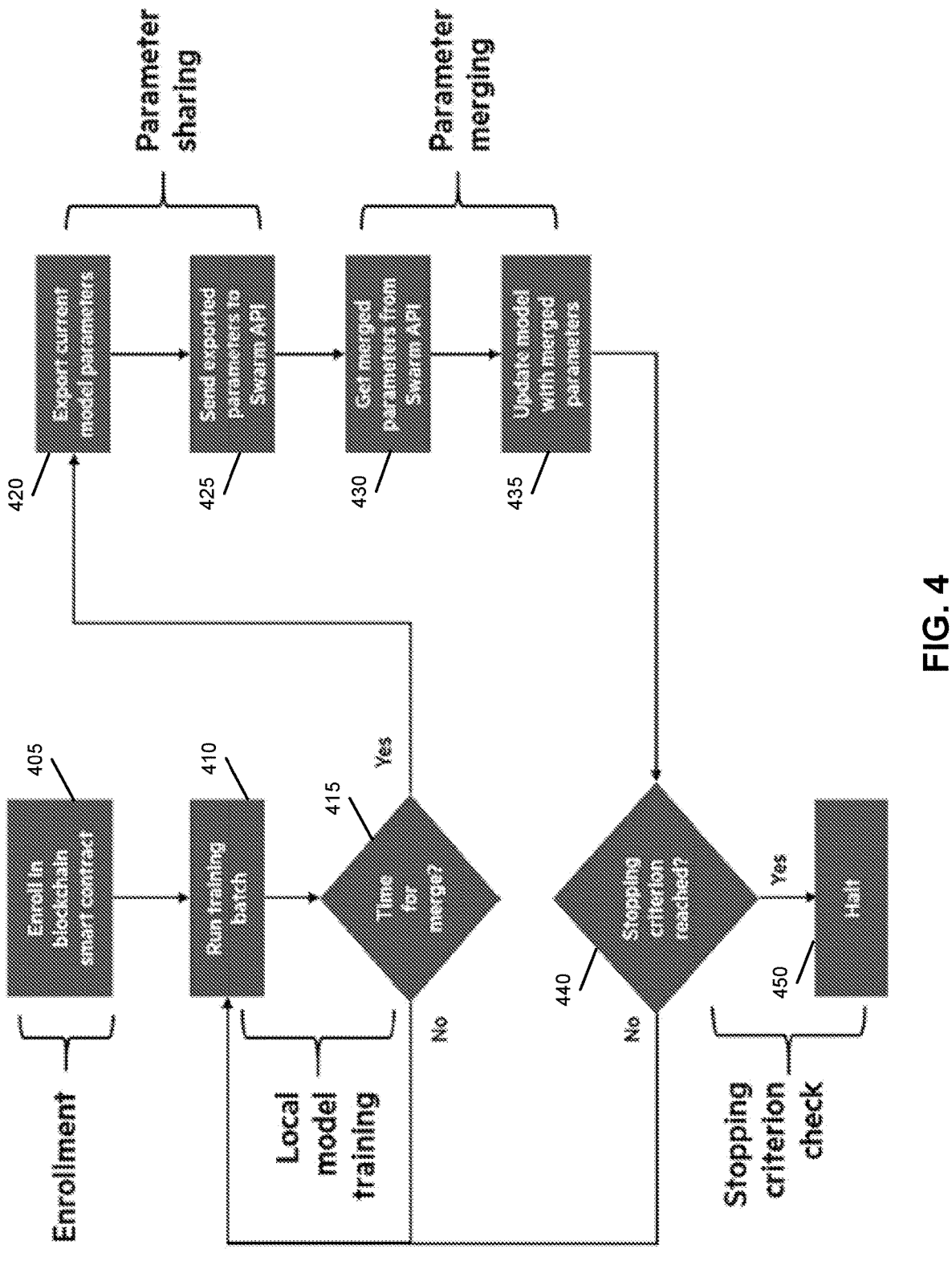
FIG. 4 illustrates an ML process for detecting global outliers, according to an example implementation of the disclosure.

FIG. 4 illustrates a swarm learning for detecting global outliers, according to an example implementation of the disclosure. For example, nodes 10 may be initialized and onboarded to the distributed system, similar to the illustrated system in FIG. 1. This may include aspects such as data sharing agreements, arrangements to ensure node visibility across organizational boundaries of the entities, and a consensus on the expected outcomes from the model training process. Values of configurable parameters, such as peer discovery nodes supplied during boot up and the synchronization frequency among nodes may also be finalized at this stage.

In some examples, nodes 10 may be installed and configured. For example, once the onboarding process finishes, all the participant nodes 10 may download and install a swarm learning, ML model platform on their respective nodes. The platform may boot up and initiate each nodes' connection to other nodes in the network which may essentially establish a blockchain overlay on the underlying network connection between the nodes. In this example, the participant nodes may designate a peer discovery process to boot first followed by the rest of the nodes in the network.

At block 405, the process may initiate an enrollment of one or more nodes. The enrollment may enroll the node in a blockchain smart contract with other nodes in the distributed computing environment. In some examples, the enrollment process is performed manually by an administrative user.

At block 410, the process may execute a training batch. The training batch may include initial data to train an ML model locally at the node with local data.

At block 415, the process may determine if it is time to merge files. The merging of files may occur during the model training phase. In some examples, the merging files process may include exchanging centroids between the nodes and/or comparing the centroid locations for each source node. If yes, the process may proceed to block 420. If no, the process may return to block 410.

At block 420, the process may export current model parameters. Exporting current model parameters may occur during a parameter sharing phase. In some examples, the learned parameters may be shared between nodes 10 and the local data used to generate the parameters may remain local and secure at the node.

In some examples, block 420 may commence once the number of nodes that are ready for parameter sharing step reaches a certain minimum threshold value specified during initialization. For example, the sharing process may begin with the process of electing the voted leader node, whose role is to merge the parameters derived after local training on all participant nodes. This selection may be relatively quick and take place at the culmination of each epoch node.

At block 425, the process may send exported parameters to an API of a second node. In some examples, the exported parameters may be transmitted to a cloud storage device for additional processing and analysis.

At block 430, the process may receive merge parameters from other nodes via its own API. For example, parameters (e.g., centroids) that are shared from all nodes may be merged to obtain a global model or plurality of centroids. One or more merge algorithms may be implemented, such as mean, weighted mean, median, and so on.

The merge process may not be not done by a static central coordinator or parameter server, rather a voted leader node that is chosen dynamically among the participating nodes. The selection of the leader node may be temporary and a different node may be selected for a later process. The leader node may perform the merge to help keep the network decentralized. In some examples, by relying on the leader node, the fault-tolerance may be greater than traditional centralized-parameter-server-based frameworks. With the global model, the nodes can have the collective intelligence of the network at their disposal, without the local data leaving the node.

Using the leader node selection, one or more nodes may emerge as the voted leader node. The voted leader node may use the Uniform Resource Identifier (URI) information of all the participant nodes and download the parameter files from each of the participant nodes to enable the parameter-merging steps.

Various layouts or topologies may be implemented. For example, a star topology may be implemented, where a single leader performs the merge. Other topologies such as a k-way merge where the merge is carried out by a set of nodes are also possible.

At block 435, the process may update its local ML model with merged parameters. For example, using the merge algorithm chosen at block 430, the leader combines the parameter values from all nodes to create a new file with the merged parameters and signals to the other nodes that a new file is available (e.g., the new plurality of centroids merged from each node's centroids). Each node then downloads the file from the leader and updates its local model with the new set of parameter values.

At block 440, the process may determine if the stopping criterion is reached. If yes, the process may proceed to block 450. If no, the process may return to block 410.

When determining if the stopping criterion is reached, the participant nodes may evaluate the model with updated parameter values using their local data to calculate various validation metrics. The values obtained from this step may be shared using a smart contract state variable. As each participant node completes this step, it signals to the network that the update and validation step is complete. In the interim, the voted leader node may keep checking for the update complete signal from each participant node. When it discovers that all merge participant nodes have signaled completion, the leader node may merge the local validation metric numbers to calculate the global metric numbers. The synchronization step is then marked as complete.

If the policy decided during initialization supports monetization during model building, the rewards corresponding to the contributions by each of the participant nodes may be calculated and dispensed at this point. Afterward, the current state of the system may be compared against the stopping criterion and if it is found to be met, the process is halted at block 450. Otherwise, the steps of local model training, parameter sharing, parameter merging, and stopping criterion check are repeated until the criterion is fulfilled.

At block 450, the process may stop.

FIG. 5 is an illustrative training and comparison process performed between two nodes, in accordance with examples of the disclosure. In this illustration, a first node and a second node of a cluster of nodes is provided. The nodes illustrated may correspond with nodes 10 in FIG. 1.

At block 510, the first node may train a first ML model with a first local data set. The first local data set may be accessible locally at the first node. The first node may acquire a trained first ML model.

At block 520, the first node may generate clusters with centroids as output from the trained first ML model.

At block 530, a second node may receive the first centroids from the first node.

At block 540, the second node may compare the centroids generated by a second locally-trained ML model with the received centroids from the first node.

At block 550, the second node may initiate an action if there are differences between the two sets of centroids.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 6:
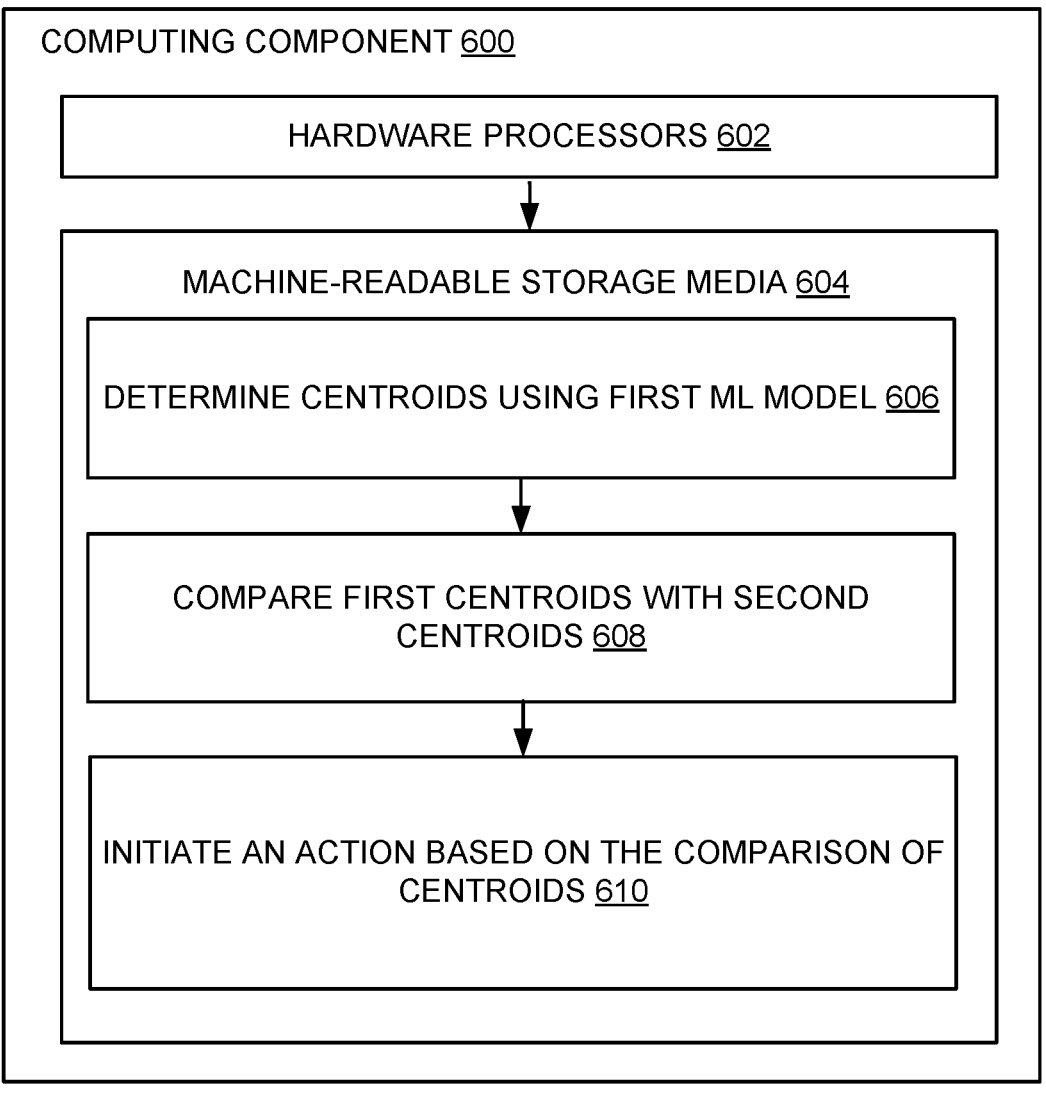
FIG. 6 is an example computing component that may be used to implement various features of embodiments described in the present disclosure.

FIG. 6 illustrates an example computing component that may be used to implement burst preloading for available bandwidth estimation in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based micropro- cessors, and/or other hardware devices suitable for retrieval and execution of instructions stored in machine-readable storage medium 604. Hardware processor 602 may fetch, decode, and execute instructions, such as instructions 606- 612, to control processes or operations for burst preloading for available bandwidth estimation. As an alternative or in addition to retrieving and executing instructions, hardware processor 602 may include one or more electronic circuits that include electronic components for performing the func- tionality of one or more instructions, such as a field pro- grammable gate array (FPGA), application specific inte- grated circuit (ASIC), or other electronic circuits.

A machine-readable storage medium, such as machine- readable storage medium 604, may be any electronic, mag- netic, optical, or other physical storage device that contains or stores executable instructions. Thus, machine-readable storage medium 604 may be, for example, Random Access Memory (RAM), non-volatile RAM (NVRAM), an Electri- cally Erasable Programmable Read-Only Memory (EE- PROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-610.

Hardware processor 602 may execute instruction 606 to determine one or more centroids using a first ML model. For example, the data used to train the model may be first sensor data in a computing environment (e.g., to determine weights and inferences) and similar sensor data may be used during production of the trained ML model. The output of the ML model may determine a first plurality of centroids of clusters of the first sensor data.

Hardware processor 602 may execute instruction 608 to compare the first plurality of centroids of clusters of the first sensor data with a second plurality of centroids generated by a second ML model. For example, the second plurality of centroids may be received from participant nodes in a distributed, blockchain network and merged by a leader node. The comparison may be implemented on the merged set of centroids.

Hardware processor 602 may execute instruction 610 to initiate an action. For example, when an anomaly is identi- fied in comparing the first plurality of centroids with the second plurality of centroids, hardware processor 602 may initiate an action associated with the anomaly. The action may be to generate an alert to a system administrator that distinctions exist in excess of a threshold value between the two network devices of the computing environment. Other actions may include, for example, automatically rerouting data traffic, restarting a network device, updating an outlier log file, or other actions. The action may help identify or remedy the anomaly.

Figure 7:
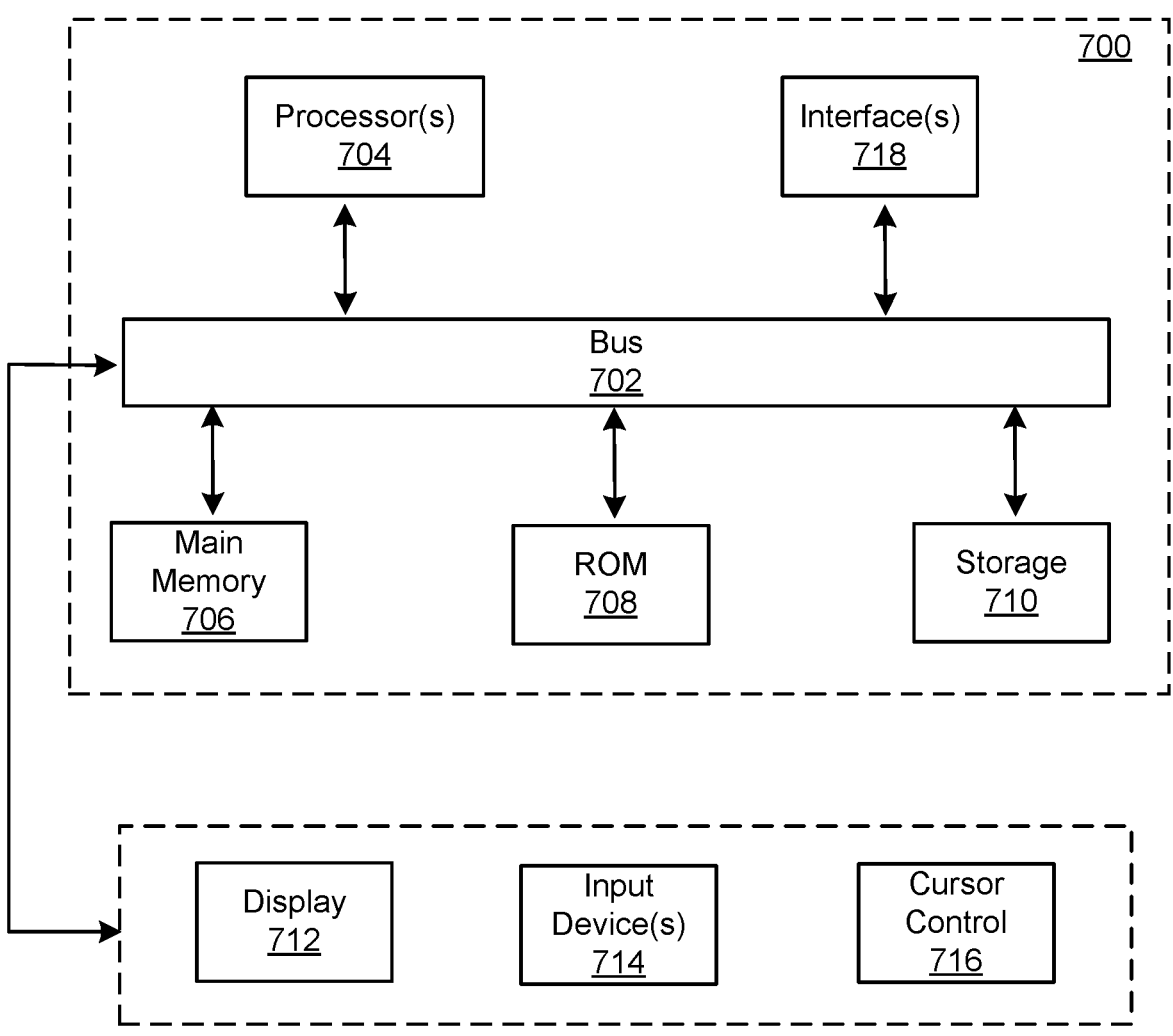
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware proces- sors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate informa- tion during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direc- tion information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A first network device comprising:
   a memory; and
   one or more processors that are configured to execute machine readable instructions stored in the memory for performing a method comprising:
   provide first sensor data in a computing environment as input to a first machine learning (ML) model, wherein output of the first ML model determines a first plurality of centroids of clusters of the first sensor data;
   initiate a first comparison that determines a distance between the first plurality of centroids of clusters of the first sensor data and historical centroids generated by the first ML model;
   in response to the distance from the first comparison exceeding a threshold value, initiate a second comparison between the first plurality of centroids of clusters of the first sensor data with a second plurality of centroids generated by a second ML model from a second network device; and
   when an anomaly is identified in comparing the first plurality of centroids with the second plurality of centroids, automatically reroute traffic data away from the first network device or the second network device in response to distinctions between the first plurality of centroids and the second plurality of centroids identified during the second comparison, wherein the distinctions between the first plurality of centroids and the second plurality of centroids are determined by:
   determining a first average X-value and a first average Y-value of the first plurality of centroids:
   determining a second average X-value and a second average Y-value of the second plurality of centroids;
   generating a plot of the first average X-value, the first average Y-value, the second average X-value, and the second average Y-value; and
   using the plot, determining whether the first average X-value, the first average Y-value, the second average X-value, or the second average Y-value are closer to a centroid of a third cluster than it is to a centroid of its own cluster.

2. The network device of claim 1, wherein the method further comprising:
   generate an electronic message comprising the first plurality of centroids of clusters of the first sensor data; and
   transmit the electronic message to a third network device in the computing environment, wherein the third network device provides the second sensor data back to the first network device, and wherein the network device executes the second ML model with the second sensor data to generate the second plurality of centroids.

3. The first network device of claim 1, wherein the first ML model and the second ML model are both unsupervised ML models.

4. The first network device of claim 3, wherein the first ML model and the second ML model implement a K-Means algorithm.

5. The first network device of claim 1, wherein the first sensor data is received from applications executed on a server infrastructure in the computing environment.

6. The first network device of claim 1, wherein the first network device and the second network device form a blockchain.

7. The first network device of claim 1, wherein the first network device and the second network device implement swarm learning of anomalies in the computing environment.

8. The first network device of claim 1, wherein the first network device and the second network device are switches in the computing environment.

9. A first network device comprising:
   a memory; and
   one or more processors that are configured to execute machine readable instructions stored in the memory for performing a method comprising:
   receive a first plurality of centroids of clusters of first sensor data, wherein the first plurality of centroids of clusters are determined by a second network device running a first machine learning (ML) model in a computing environment, wherein the first plurality of centroids were received in response to a first comparison that determines a distance between the first plurality of centroids of clusters of the first sensor data and historical centroids generated by the first ML model;

initiate a second comparison between the first plurality of centroids of clusters of the first sensor data with a second plurality of centroids generated by a second ML model; and when the second comparison exceeds a threshold value and an anomaly is identified in comparing the first plurality of centroids with the second plurality of centroids, automatically reroute traffic data away from the first network device or the second network device in response to distinctions between the first plurality of centroids and the second plurality of centroids identified during the second comparison, wherein the distinctions between the first plurality of centroids and the second plurality of centroids are determined by:

determining a first average X-value and a first average Y-value of the first plurality of centroids;

determining a second average X-value and a second average Y-value of the second plurality of centroids;

generating a plot of the first average X-value, the first average Y-value, the second average X-value, and the second average Y-value; and using the plot, determining whether the first average X-value, the first average Y-value, the second average X-value, or the second average Y-value are closer to a centroid of a third cluster than it is to a centroid of its own cluster.

10. The first network device of claim 9, the method further comprising:

receive second sensor data in the computing environment; and provide the second sensor data as input to the second ML model, wherein output of the second ML model determines the second plurality of centroids of clusters of the second sensor data.

11. The first network device of claim 9, the method further comprising:

generate an electronic message comprising the first plurality of centroids of clusters of the first sensor data; and transmit the electronic message to a third network device in the computing environment, wherein the third network device provides second sensor data to the first network device, and wherein the first network device executes the second ML model with the second sensor data to generate the second plurality of centroids.

12. The first network device of claim 9, wherein the first ML model and the second ML model are both unsupervised ML models.

13. The first network device of claim 12, wherein the first ML model and the second ML model implement a K-Means algorithm.

14. The first network device of claim 9, wherein the first sensor data is received from applications executed on a server infrastructure in the computing environment.

15. The first network device of claim 9, wherein the network device and the second network device form a blockchain.

16. The first network device of claim 9, wherein the network device and the second network device implement swarm learning of anomalies in the computing environment.

17. The first network device of claim 9, wherein the network device and the second network device are switches in the computing environment.

18. A computer-implemented method comprising:

providing first sensor data in a computing environment as input to a first machine learning (ML) model, wherein output of the first ML model determines a first plurality of centroids of clusters of the first sensor data;

initiating a first comparison that determines a distance between the first plurality of centroids of clusters of the first sensor data and historical centroids generated by the first ML model;

in response to the distance from the first comparison exceeding a threshold value, initiating a second comparison between the first plurality of centroids of clusters of the first sensor data with a second plurality of centroids generated by a second ML model from a second network device; and when an anomaly is identified in comparing the first plurality of centroids with the second plurality of centroids, automatically rerouting traffic data away from the first network device or the second network device in response to distinctions between the first plurality of centroids and the second plurality of centroids identified during the second comparison, wherein the distinctions between the first plurality of centroids and the second plurality of centroids are determined by:

determining a first average X-value and a first average Y-value of the first plurality of centroids;

determining a second average X-value and a second average Y-value of the second plurality of centroids;

generating a plot of the first average X-value, the first average Y-value, the second average X-value, and the second average Y-value; and using the plot, determining whether the first average X-value, the first average Y-value, the second average X-value, or the second average Y-value are closer to a centroid of a third cluster than it is to a centroid of its own cluster.

19. The first network device of claim 1, further comprising:

in response to determining that the first average X-value, the first average Y-value, the second average X-value, or the second average Y-value is closer to the centroid of the third cluster, redistributing points from its own cluster to the third cluster.

20. The first network device of claim 9, further comprising:

in response to determining that the first average X-value, the first average Y-value, the second average X-value, or the second average Y-value is closer to the centroid of the third cluster, redistributing points from its own cluster to the third cluster.

* * * * *